United States Patent
Matias et al.

(10) Patent No.: US 6,519,593 B1
(45) Date of Patent: Feb. 11, 2003

(54) EFFICIENT BUNDLE SORTING

(76) Inventors: Yossi Matias, Harnishmar Haezrachi-12, Afeka 69690 Tel Aviv (IL); Eran Segal, 102 Haskin Ct., Apt. 8E, Palo Alto, CA (US) 94305

(*) Notice: Subject to any disclaimer, the term of this patent is extended or adjusted under 35 U.S.C. 154(b) by 0 days.

(21) Appl. No.: 09/461,286

(22) Filed: Dec. 15, 1999

Related U.S. Application Data

(60) Provisional application No. 60/112,190, filed on Dec. 15, 1998.

(51) Int. Cl.[7] .............................................. G06F 17/30
(52) U.S. Cl. .......................................................... 707/7
(58) Field of Search ............................... 707/7, 3, 102, 707/8; 700/213; 709/105

(56) References Cited

U.S. PATENT DOCUMENTS 5,855,016 A * 12/1998 Edem et al. .................... 707/7

OTHER PUBLICATIONS

Lars Arge et al, On Sorting Strings in External Memory, Proceedings of the twenty eighth annual ACM symposium on theory of computing, May'1997 (pp. 540–548).*

* cited by examiner

Primary Examiner—Diane D. Mizrahi
Assistant Examiner—Apu M Mofiz
(74) Attorney, Agent, or Firm—Irah H. Donner; Hale and Dorr LLP

(57) ABSTRACT

Many data sets to be sorted consist of a limited number of distinct keys. Sorting such data sets can be thought of as bundling together identical keys and having the bundles placed in order; we therefore denote this as bundle sorting. We describe an efficient algorithm for bundle sorting in external memory that requires at most $c(N/B)\log_{M/B}k$ disk accesses, where N is the number of keys, M is the size of internal memory, k is the number of distinct keys, B is the transfer block size, and $2<c<4$. For moderately sized k, this bound circumvents the $\Theta((N/B)\log_{M/B}(N/B))$ I/O lower bound known for general sorting. We show that our algorithm is optimal by proving a matching lower bound for bundle sorting. The improved nning time of bundle sorting over general sorting can be significant in practice, as demonstrated by experimentation. An important feature of the new algorithm is that it is executed "in-place", requiring no additional disk space.

8 Claims, 4 Drawing Sheets

EFFICIENT BUNDLE SORTING

RELATED APPLICATIONS

This application claims priority to, and incorporates by reference, U.S. Provisional Application No. 60/112,190, filed on Dec. 15, 1998.

FIELD OF THE INVENTION

The present invention related generally to the efficient bundle sorting.

BACKGROUND OF THE INVENTION

External memory sorting is an extensively researched area. Many efficient in-memory sorting algorithms have been adapted for sorting in external memory such as merge sort, and much of the recent research in external memory sorting has been dedicated to improving the run time performance. Over the years, numerous authors have reported the performance of their sorting algorithms and implementations (cf [Aga96, BBW86, BGK90]). We note a recent paper [ADADC+97] which shows external sorting of 6 GB of data in under one minute on a network of workstations. For the problem of bundle sorting where k<N/B we note that our algorithm will reduce the number of I/Os that all these algorithms perform and can hence be utilized in benchmarks. We also consider a more performance-sensitive model of external memory in which rather than just counting the I/Os for determining the performance, there is a reduced cost for sequential I/Os compared to random access I/Os. We study the tradeoffs there, and show the adaptation in our bundle sorting algorithm to arrive at an optina algorithm in that model. We also note that another recent paper [ZL98] shows in detail how to improve the merge phase of the external merge sort algorithm, a phase that is completely avoided by using our in-place algorithm.

In the general framework of external memory algorithms, Aggarwal and Vitter showed a lower bound of $\Omega((N/B)\log_{M/B}k(N/B))$ on the number of I/Os needed in the worst case for sorting [AV88, Vit99]. In contrast, since our algorithm relies on the number k of distinct keys for its performance, we are able to circumvent this lower bound when k<<N/B. Moreover, we prove a matching lower bound for bundle sorting which shows that our algorithm is optimal.

Finally, sorting is used not only to produce sorted output, but also in many sort-based algorithms such as grouping with aggregation, duplicate removal, sort-merge join, as well as set operations including union, intersect, and except [Gra93, IBM95]. In many of these cases the number of distinct keys is relatively small and hence bundle sorting can be used for improved performance. We identify important applications for bundle sorting, but note that since sorting is such a common procedure, there are probably many more applications for bundle sorting that we did not consider.

SUMMARY OF THE INVENTION

Many data sets to be sorted consist of a limited number of distinct keys. Sorting such data sets can be thought of as bundling together identical keys and having the bundles placed in order; we therefore denote this as bundle sorting. We describe an efficient algorithm for bundle sorting in external memory that requires at most $c(N/B)\log_{M/B}k$ disk accesses, where N is the number of keys, M is the size of internal memory, k is the number of distinct keys, B is the transfer block size, and 2<c<4. For moderately sized K this bound circumvents the $\Theta((N/B)\log_{M/B}(N/B))$ I/O lower bound known for general sorting. We show that our algorithm is optimal by proving a matching lower bound for bundle sorting. The improved running time of bundle sorting over general sorting can be significant in practice, as demonstrated by experimentation. An important feature of the new algorithm is that it is executed "in-place", requiring no additional disk space.

The present invention discloses a method of sorting data sets including a predetermined number of distinct keys. The method is comprised of, for example, two steps. The first step is comprised of bundling the data sets where substantially identical keys, having substantially identical key values, are bundled together. The second step is comprised of ordering the bundles in a predetermined order, with respect to the order defined by the substantially identical key values for each bundle. The method is performed preferably using external memory.

DESCRIPTION OF THE PREFERRED EMBODIMENTS OF THE INVENTION

Figure 1:
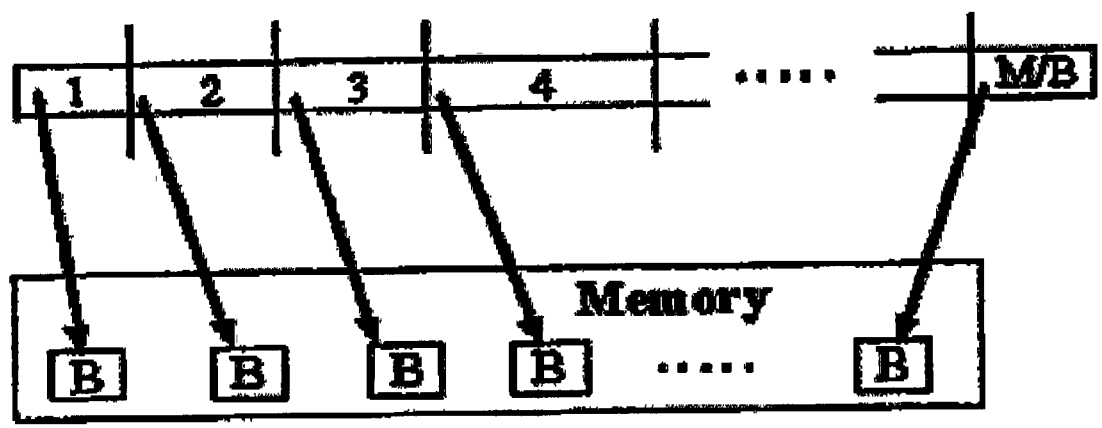
FIG. 1 illustrates Initiation of the M/B blocks in "one-pass sorting". After the counting pass, we know where the sorted blocks reside and load blocks from these locations. Swaps are performed in memory. When any of the blocks is full, we write it to disk to the location from which it was loaded and load the next block from disk.

Sorting is a frequent operation in many applications. It is used not only to produce sorted output, but also in many sort-based algorithms such as grouping with aggregation, duplicate removal, sort-merge join, as well as set operations including union, intersect, and except [Gra93, IBM95]. In the present invention, we identify a common external memory sorting problem, give an algorithm to solve it while circumventing the lower bound for general sorting for this problem, prove a matching lower bound for our algorithm, and demonstrate the improved performance through experiments.

External mergesoit is the most commonly used algorithm for large-scale sorting. It has a run formation phase, which produces sorted runs, and a merge phase, which merges the runs into sorted output. Its running time, as in most external memory algorithms, is dominated by the number of I/Os performed, which is $O((N/B)\log_{M/B}(N/B))$, where N is the number of keys, M is the size of internal memory, and B is the transfer block size. It was shown in [AV88] (see also [Vit99]) that there is a matching lower bound within a constant factor.

The number of passes over the sequence performed by sorting algorithms is $[\log_{M/B}(N/B)]$ in the worst case. When the available memory is large enough compared to the size of the sequence, the sorting can be performed in one or two passes over the sequence (see [ADADC+97] and references therein). However, there are many settings in which the available memory is moderate, at best. For instance, in multi-threading and multi-user environments, an application, process, or thread which may execute a sorting program, might only be allocated with a small fraction of the machine memory. Such settings may be relevant to anything from low-end servers to highend decision support systems. For moderate size memory $\log_{M/B}(N/B)$ may become large enough to imply a significant number of passes over the data As an example, consider the setting N=256 GB, B=128 KB, and M=16 MB. Then we have $\log_{M/B}(N/B)=3$, and the number of I/Os per disk block required by merge sort is at least 6. For snaller memory allocations, the I/O costs will be even greater.

Data sets that are to be sorted often consist of keys taken from a bounded universe. This fact is well exploited in main memory algorithms such as counting sort and radix sort, which are substantially more efficient than general sort. In this paper we consider the extent to which a limit, k on the number of distinct keys can be exploited to obtain more effective sorting algorithms in external memory on massive data sets, where the attention is primarily given to the number of I/Os. Sorting such data sets can be thought of as bundling together identical keys, and having the bundles placed in order; we therefore denote this as bundle sorting. It is similar to partial sorting which was identified by Knuth [Knu73] as an important problem while many algorithms are given for partial sorting in main memory, to the best of our knowledge, there exist no efficient algorithms to solve the problem in external memory. As we shall see, bundle sorting can be substantially more efficient than general sorting.

A key feature of bundle sorting is that the number of I/Os performed per disk block depends solely on the number k of distinct keys. Hence, in sorting applications in which the number of distinct keys is constant, the number of I/Os performed per disk block remains constant for any data set size. In contrast, merge sort or other general sorting algorithms will perform more I/Os per disk block as the size of the data set increases. In setgs in which the size of the data set is large this can be significant In the example given earlier, six I/Os per data block are needed to sort in the worst cases. For some constant k<100 bundle sorting performs only two I/Os per disk block and for some constant k<10000 only four I/Os per disk block regardless of the size of the data set The algorithm we present requires at most $3\log_{M/B}k$ passes over the sequence. It performs the sorting in-place, meaning that the input data set can be permuted as needed without using any additional working space in external memory. When the number k of distinct keys is less than N/B, our bundle sorting algorithm circumvents the lower bound for general sorting. In contrast to general sorting, bundle sorting is not harder than permuting; rather than requiring that a particular key is to be moved to a specific location, it is required that the key is to be moved to a location within a specified range, which belongs to its bundle. This so called bundle permutation consists of a set of permutations, and implementing bundle-permutation can be done more efficiently than implementing a particular permutation.

For cases in which k<<N/B, the improvement in the running time of bundle sorting over general sorting algorithms can be significant in practical sorting settings, as supported by our experimentation done on U.S. Census data and on synthetic data In fact, the number of passes over the sequence executed by our algorithm does not depend at all on the size of the sequence, in Contrast to general sorting algorithms.

We prove a matching lower bound for bundle sorting. This lower bound is realized by proving lower bounds on two problems that are both easier than bundle sorting. The first is bundle permutation and the second is a special case of matrix transposition. Consider bundle permutation; that is a special case of bundle sorting where we are told the range of locations for each key and is thus easier than bundle sorting much like the argument that permuting is easier than general sorting. Consider a special case of matrix transposition where we are transposing a k×N/k matrix, in which the final order of the elements in each row is not important; this is a special case of bundle sorting of N keys consisting of exactly N/k records for each of k different keys and is thus easier than bundle sorting. The number of I/Os required in the worst case to sort N keys consisting of k distinct keys is $\Omega((N/B)\log_{M/B}k)$.

Our bundle sorting algorithm is based on a simple observation: If the available memory, M, is at least kB, then we can sort the data in three passes over the sequence, as follows. In the first pass, we count the size of each bundle. After this pass we know the range of blocks in which each bundle will reside upon termination of the bundle sorting. The first block from each such range is loaded to main memory. The loaded blocks are scanned concurrently, while swapping keys so that each block is filled only with keys belonging to its bundle. Whenever a block is fully scanned (i.e., it only contains keys belonging to its bundle), it is written back to disk and the next block in its range is loaded. In this phase, each block is loaded exactly once (except for at most k blocks in which the ranges begin), and the total number of accesses over the input sequence in the entire algorithm is hence 3. Whenever memory is insubstantial to hold the k blocks in memory, we group bundles together into M/B super-bundles, implementing the algorithm to sort the super-bundles to M/B sub-sequences, and re-iterate within each sub-sequence, incurring a total of $\log_{M/B}k$ iterations over the sequence to complete the bundle sorting.

There are many applications and settings in which bundle sorting may be applied resulting in a significant speed-up in performance. For instance, any application that requires partial sorting or partitioning of a data set into value independent buckets can take advantage of bundle sorting since the number of buckets (k in bundle sorting) is small thus making bundle sorting very appealing. Another example would be accelerating sort join computation for suitable data sets: Consider a join operation between two large relations, each having a moderate number of distinct keys; then our bundle sorting algorithm can be used in a sort join computation, with performance improvement over the use of general sort algorithm.

Finally, we consider a more performance-sensitive model that, rather than just counting the number of I/Os as a measurement for performance, differentiates between a sequential I/O and a random I/O and assigns a reduced cost for sequential I/Os. We study the tradeoffs that occur when we apply bundle sorting in this model and show a simple adaptation of bundle sorting that results in an optimal performance. In this sense, we also present a slightly different algorithm for bundle sorting that is more suitable for sequential I/Os.

In our main bundle sorting algorithm and in the lower bound we prove, we use the external memory model from Aggarwal and Vitter [AV88] (see also [Vit99]). The model is as follows. We assume that there is a single central processing unit, and we model secondary storage as a generalized random-access magnetic disk (For completeness, the model is also extended to the case in which the disk has some parallel capabilities). The parameters are N=# records to sort;
M=# records that can fit into internal memory;
B=# records transferred in a single block;
D=# blocks that can be transferred concurrently, Where $1 \leq B \leq M/2$, M<N, and $1 \leq D \leq [M]$. For brevity we consider only the case of D=1, which corresponds to a single conventional disk The parameters N, M, and B are referred to as the file size, memory size, and transfer block size, respectively. Each block transfer is allowed to access any contiguous group of B records on the disk. We will consider the case where D=1, meaning that there is no disk parallelism. Performance in this model is measured by the number of I/O accesses performed where the cost of all I/Os is identical. In Section 6 we consider a more performance-sensitive model in which we differential between costs of sequential and random-access I/Os and assign a reduced cost for sequential I/Os.

We present our bundle sorting algorithm which sorts in-place a sequence that resides on disk and contains k distinct keys. We start by defining the bundle sorting problem:

Input: A sequence of keys $\{a_1, a_2, \ldots, a_n\}$ from an ordered universe U of size k.
Output: A permutation $\{a'_1, a'_2, \ldots, a'_n\}$ of the input sequence such that: $a'_1 \leq a'_2 \leq a'_n$.

In our algorithm, it will be easy, and with negligible overhead, to compute and use an order preserving mapping from U to $\{1, \ldots, k\}$; we discuss the implementation details of this function in Section 4.2; this enables us to consider the problem at hand as an integer sorting problem in which the keys are taken from $\{1, \ldots, k\}$. Hence, we assume that $U = \{1, \ldots, k\}$.

We use the external memory model from Section 3, where performance is determined by the number of I/Os performed. Our goal is to minimize the number of disk I/Os. In Section 6 we consider a more performance-sensitive model in which rather than simply counting I/Os as a measurement of performance we differentiate between a sequential I/O and a random I/O and assign a reduced cost to sequential I/Os. We show the necessary adaptation of bundle sorting as it is presented in this section in order to achieve an optimum in that model.

We start by presenting "one-pass sorting"—a procedure that sorts a sequence into $\mu = [M/B]$ distinct keys. It will be used by our bundle sorting algorithm to perform one iteration that sorts a chunk of data blocks into $\mu$ ranges of keys.

The general idea is this: Initially we perform one pass on the sequence, loading one block of size B at a time, in which we count the number of appearances of each of the $\mu$ distinct keys in the sequence. Next, we keep in memory $\mu$ blocks and a pointer for each block, where each block is of size B. Using the count pass, we initialize the $\mu$ blocks, where the ith block is loaded from the exact location in the sequence where keys of type i will start residing in the sorted sequence. We set each block pointer to point to the first key in its block. When the algorithm runs, the ith block pointer is advanced as long as it encounters keys of type i. When a block pointer is "stuck" on a key of type j, it awaits for the jth block pointer until it too is 'stuck' (this will happen since a block pointer only yields to keys of its block), in which case a swap is performed and at least one of the two block pointers may continue to advance. When any of the $\mu$ block pointers reaches the end of its block, we write that block back to disk to the exact location from which it was loaded and load the next contiguous block from disk into memory (and of course set its block pointer again to the first key in the block). We finish with each of the $\mu$ blocks upon crossing the boundaries of the next adjacent block. The algorithm terminates when all blocks are done with. See FIG. 1. LEMMA 4.1 Let S be a sequence of N keys from $\{1, \ldots, \mu\}$, let B be the transfer block size and let M be the available memory such that $M \geq \mu B$. Then the sequence can be sorted in place using the procedure "one-pass sorting" with a total of $[3N/B+M/B]$ I/Os.

We now present the complete integer soiling algorithm. We assume that the sequence contains keys in the range $1, \ldots, k$ where k is the number of distinct keys. In Section 4.2 we discuss the adaptation needed if the k distinct keys are not how this integer range. We use the above "one-pass sorting" procedure. The general idea is this: We initially perform one sorting iteration in which we sort the sequence into k'=[M/B] keys. We select a mapping function $f$ such that for all $1 \leq i \leq k$ we have $f(i) = [ik'/k]$, and we apply $f$ to every key when the key is examined. This ensures us that we are actually in the range of $1, \ldots, k'$. Moreover, it will create sorted buckets on disk such that the number of distinct keys in each of the buckets is roughly k/k'. We repeat this procedure recursively for each of the sorted blocks obtained in this iteration until the whole sequence is sorted. Each sorting iteration is done by calling the procedure for one-pass sorting. We give a pseudo code of the algorithm below, followed by an analysis of its performance.

The Integer Sorting Algorithm
Procedure sort (sequence, k, M, B)
   k'=max([M/B],2) //compute k'
   if k>2) then
     call one-pass sorting (sequence, k', M, B)
     for i=1 to k'
       bucket=the ith bucket sorted
       call sort (bucket,[k/k'], M, B)
Theorem 1

Let S be a sequence of N keys from $\{1, \ldots, k\}$, let M be the available memory and let B be the transfer block size. Then we can in place sort a sequence residing on disk using the bundle sorting algorithm, which the number of I/Os is at most $$\left\lceil \frac{3N}{B} \log_{[M/B]} k \right\rceil.$$

Previously, we assumed that the input is in the range $1, \ldots, k$, where k is the number of distinct keys in the sequence. We now discuss how to construct a mapping function when the input is not in this range.

In the simple case where the input is from a universe that is not ordered, (i.e., the sorting is done just to cluster keys together) we can simply select any universal hash function as our mapping function. This ensures us that the number of distinct keys that will be distributed to each bucket is fairly equal and our algorithm performs without any loss of performance.

For the general case we assume that the input is from an ordered universe U and consists of k distinct keys. We show how to construct a mapping function from U to $1, \ldots, k$. More specifically, we need a way to map the keys into the range [1,M/B] at every application of the one-pass sorting procedure. A solution to this mapping is to build an M/B-ary tree, whose leaves are the k distinct keys in sorted order and each internal node stores the minimum and the maximum values of its M/B children. Each application of one-pass sorting in integer sorting corresponds to an internal node in the tree (starting from the root) along with its children, so the tree provides the appropriate mapping. This is because in each run of one-pass sorting the keys are within the range of the minimum and maximum values stored in the corresponding internal node, and the mapping into $1, \ldots, M/B$ is done according to the ranges of the internal node's children, Constructing the sorted leaves can be done via count sort, in which we are given a sequence of size N with k distinct keys and we need to produce a sorted list of the k distinct keys and their counts. An easy way to do count sort is via merge sort, in which identical keys are combined together (and their counts summed) whenever they appear together. In each merge sort pass, the output ran will never be longer than k/B blocks. Initially, the runs contain at most M/B blocks. After $\log_{M/B}(k/B)$ passes, the runs will be of length at most k/B blocks, and after that point the number of nms decrease geometrically and the running time is thus linear in the number of I/Os. The rest of the tree can be computed in at most one extra scan of the leaves-array and lower order post-processing. We can show the following:

Lemma 4.2 ([WVI98])

We can count-sort a sequence of size N consisting of k distinct keys, using a memory of size M and block transfer size B. within an I/O bound of $$\frac{2N}{B}\log_{M/B}\frac{k}{B}.$$

An interesting observation is that by adding a count to each leaf representing its frequency in the sequence, and a count to each internal node which is the sum of the counts of its children, we can eliminate the count phase of the one-pass sorting procedure in the integer sorting algorithm. Thus, the general bundle sorting algorithm is as follows. Initially, we use count sort and produce the tree. We now traverse the tree, and on each internal node we call one-pass sorting where the mapping function is simply the ranges of values of the node's M/B children. By combining Theorem 4.1 and Lemma 4.2 we can prove the bound for general bundle sorting.

Theorem 2

Let S be a sequence of size N which consists of k distinct keys, let M be the available memory and let B be the transfer block size. Then we can in place sort S using the bundle sorting algorithm, while the number of I/Os is at most $$\frac{2N}{B}\left(\log_{[M/B]}k + \log_{[M/B]}\frac{k}{B}\right).$$

For all $k<B^2$, this bound would be better than the $3(N/B)\log_{[M/B]}k$ bound, for integer sorting. Note that we can traverse the tree in either BFS or DPS. If we choose BFS, the sorting will be done concurrently and we get an algorithm that gradually refines the sort. If we choose DFS, we get fully sorted items quickly while the rest of the items are left completely unsorted. The overhead we incur by using the mapping will be in memory, where we now have to perform a search over the M/D children of the internal node that we are traversing in order to determine the mapping of each key into the range $1, \ldots, M/B$. Using a simple binary search over the ranges, the overhead will be an additional $\log_2(M/B)$ memory operations per key.

We present a lower bound for the I/O complexity of bundle sorting. We let k be the number of distinct keys, M be the available memory, N be the size of the sequence, B be the transfer block size and differentiate between two cases:

1. $k/B = B^{\Omega(1)}$ or $M/B = B^{\Omega(1)}$. We prove the lower bound for this case by proving a lower bound on bundle permutation which is an easier problem than bundle sorting.
2. $k/B = B^{o(1)}$ and $M/B = B^{o(1)}$. We prove the lower bound for his case by proving a lower bound on a special case of matrix transposition which is easier than bundle sorting.

Lower Bound Using Bundle Permutation

We assume that $k/B = B^{\Omega(1)}$ or $M/B = B^{\Omega(1)}$ and use a similar approach as in the lower bound for general sorting of Aggarwal and Vitter [AV88] (see also [Vit99]). They proved the lower bound on the problem of computing an arbitrary permutation, which is easier than sorting. Bundle sorting is not necessarily harder than computing an arbitrary permutation, since the output sequence may consist of one out of a set of permutations, denoted as a bundle-permutation. A bundle permutation is an equivalence class of permutations, where two permutations can be in the same class if one can be obtained from the other by permuting within bundles. Computing a permutation from an arbitrary bundle permutation, which we will refer to as the bundle permutation problem, is easier than bundle sorting.

Lemma 1

Under the assumption that $k/B = B\Omega(1)$ or $M/B = B^{\Omega(1)}$, the number of I/Os required in the worst case for sorting N data items of k distinct keys, using a memory of size M and block transfer size B, is $$\Omega\left(\frac{N}{B}\log_{M/B}k\right).$$

Proof. Given a sequence of N data items consisting of k bundles of sizes $a_1, a_2, \ldots, a_k$, the number of distinct bundle permutations is $$\frac{N!}{a_1! \cdot a_2! \cdots a_k!} \geq \frac{N!}{\left(\left(\frac{N}{k}\right)!\right)^k};$$

the inequality is obtained using convexity argument.

For the bundle-permutation problem we measure, for each $t \geq 0$, the number of distinct orderings that are realizable by at least one sequence of t I/Os. The value of t for which the number of distinct orderings first exceeds the minimum orderings needed to be considered is a lower bound on the worstase number of I/Os needed for the bundle permutation problem and thus on the bundle sorting on disks.

Initially, the number of different permutations defined is 1. We consider the effect of an output operation. There can be at most $N/B+t-1$ full blocks before the tth output, and hence the tth output changes the number of permutations generated by at most a multiplicative factor of $N/B+t$, which can be bounded trivially by N log N. For an input operation, we consider a block of B records input from a specific block on disk. The B data keys in the block can intersperse among the M keys in the internal memory in at most $$\binom{M}{B}$$

ways, so the number of realizable orderings increases by a factor of $$\binom{M}{B}.$$

If the block has never before resided in internal memory, the number of realizable orderings increases by an extra factor of B!, since the keys in the block can be permuted among themselves. This extra contribution can only occur once for each of the N/B original blocks. Hence, the number of distinct orderings that can be realized by some sequence of t I/Os is at most $$(B!)^{N/B}\left(N\log N\binom{M}{B}\right)^t.$$

We want to find the minimum t for which the number of realizable orderings exceeds the minimum orderings required. Hence we have $$(B!)^{N/B}\left(N\log N\binom{M}{B}\right)^t \geq \frac{N!}{\left(\left(\frac{N}{k}\right)!\right)^k}.$$

Taking the logarithm and applying Stirling's formula, with somne algebraic manipulations, we get $$t\left(\log N + B\log\frac{M}{B}\right) = \Omega\left(N\log\frac{k}{B}\right).$$

By solving for t we get $$\text{number of } IOs = \Omega\left(\frac{N}{B}\log_{M/B}\frac{k}{B}\right).$$

Recall that we assume either $k/B = B^{\Omega(1)}$ or $M/B = B^{\Omega(1)}$. In either case, it is easy to see that $\log_{M/B}(k/B) = \Theta(\log_{M/B}k)$, which gives us the desired bound.

Lower Bound Using a Special Case of Matrix Transposition

We now assume that $k/B = B^{o(1)}$ and $M/B^{o(1)}$ (the case not handled earlier) and prove a lower bound on a special case of matrix transposition, which is easier than bundle sorting. Our proof is under the normal assumption that the records are treated indivisibly and that no compression of any sort is utilized.

Lemma 2

Under the assumption that $k/B = B^{o(1)}$ and $M/B = B^{o(1)}$, the number of I/Os required in the worst case for sorting N data items of k distinct keys, using a memory of size M block transfer size B, is $$\Omega\left(\frac{N}{B}\log_{M/B}k\right).$$

Proof. Consider the problem of transposing a k×N/k matrix, in which the final order of the elements in each row is not important. More specifically, let us assume that the elements of the matrix are originally in column-major order. The problem is to convert the matrix into row-major order, but the place in a row to where the element goes can be arbitrary as long as it is transferred to the proper row. Each element that ends up in row i can be thought of as having the same key i. This problem is a special case of sorting N keys consisting of exactly N/k records for each of the k distinct keys. Hence, this problem is easier than bundle sorting. We now prove a lower bound for this problem of $$\Omega\left(\frac{N}{B}\log_{M/B}\min(k,B)\right)$$

I/Os. Under our assumption that $k/B = B^{o(1)}$ this proves the desired bound for bundle sorting. We can assume that $k \leq N/B$ since otherwise bundle sorting can be executed by using any general sorting algorithm. We assume, without loss of generality, by the indivisibility of records assumption, that there is always exactly one copy of each record, and it is either on disk or in memory but not in both. At time t, let $X_{ij}$, for $1 \leq i \leq k$ and $1 \leq 1 \leq j \leq N/B$, be the number of elements in the jth block on disk that need to end up on the ith row of the transposed matrix. At time t, let $Y_i$ be the number of elements currently in internal memory that need to go on the ith row in the transposed matrix. We use the potential function $f(\chi) = \chi \log \chi$, for all $\chi \geq 0$. Its value at $\chi = 0$ is $f(0) = 0$. We define the overall potential function POT to be $$POT = \sum_{i,j} f(X_{ij}) + \sum_i f(Y_i).$$

When the algorithm terminates, we have $Y_i = 0$ for all i and the final value of potential POT is $$\frac{N}{B}(B\log B) + 0 = N\log B.$$

The initial potential if k<B is $$\frac{N}{B}k\left(\frac{B}{k}\log\frac{B}{k}\right) = N\log\frac{B}{k};$$

otherwise, if $k \geq B$, the initial potential is 0. Note that our potential function satisfies $$f(a+b) = (a+b)\log(a+b) \geq f(a) + f(b)$$

for all a, $B \geq 0$. Consider an output operation that writes a complete block of size B from memory to disk. If we write xi records that need to go to the ith row and there were $y_i$ such records in memory, then the change in potential is $\Sigma i(f(xi) + f(yi) - f(xi+yi)) \leq 0$. Hence output operations can only decrease the potential so we only need to consider how much an input operation increases the potential.

If we read during an input operation a complete block of B records that contains $x_i$ records that need to go to the ith row and there are $y_i$ such records already in memory, then the change in the potential is $$\sum_{1 \leq i \leq k} (f(x_i + y_i) - f(x_i) - f(y_i)).$$

By a convexity argument, this quantity is maximized when $x_i = B/k$ and $y_i = (M-B)/k$ for each $1 \leq i \leq k$, in which case the change in potential is bounded by $B\log(M/B)$. We get a lower bound on the number of read operations by dividing the difference of the initial and final potentials by the bound on the maximum change in potential per read. For k<B, we get the I/O bound $$\frac{N\log B - N\log\frac{B}{k}}{B\log\frac{M}{B}} = \frac{N}{B}\log_{M/B}k.$$

For $k \geq B$, we get the I/O bound $$\frac{N\log B - 0}{B\log\frac{M}{B}} = \frac{N}{B}\log_{M/B}B.$$

We have thus proved a lower bound of $\Omega((N/B)\log_{M/B} \min(k, B))$ I/Os. Under our assumption that $k/B=B^{o(1)}$, this gives us an I/O lower bound for this case of bundle sorting of $$\Omega\left(\frac{N}{B}\log_{M/B}k\right).$$

Theorem 1 for the lower bound of bundle sorting follows from Lemmas 1 and 2, since together they cover all possibilities for k, M, and B.

THEOREM 1. The number of I/Os required in the worst case for sorting N data items of k distinct keys, using a memory of size M and block transfer size B, is $$\Omega\left(\frac{N}{B}\log_{M/B}k\right).$$

We consider the necessary modifications in the external bundle sorting algorithm in order to achieve an optimum number of I/Os in a more performance sensitive model as in [FFM98]. In this model, we differentiate between two types of I/Os: sequential I/Os and random I/Os, where there is a reduced cost for sequential I/Os. We start by presenting the model, followed by the modifications necessary in the bundle sorting as presented in Section 4.2. We also provide an additional, slightly different integer sorting algorithm that, depending on the setting. may enhance performance by up to 33% in this model for the integer sorting problem.

The only difference between this model and the external memory model presented in Section 3 is that we now differentiate between costs of two types of I/O: sequential and random I/Os. We define l to be the latency to move the disk read/write head to a new position during a random seek. We define r to be the cost of reading a block of size B into internal memory once the read/write head is positioned at the start of the block.

The parameters N, M, and B, as before, are referred to as the file size, memory size, and transfer block size, respectively, and they satisfy $1 \leq B \leq M/2$ and M<N. We will consider the case where D=1, meaning that there is no disk parallelism. It should be clear, from the above parameters, that the cost of a random I/O that loads one transfer block into memory is l+r and the cost of a sequential I/O is simply r.

The modification for bundle sorting is based on the observation that in the worst-case scenario of the algorithm, every I/O in the sorting pass can be a random I/O. This is because we are loading [M/B] blocks from disk into [M/B] buckets and in the worst case they may be written back in a round robin fashion resulting solely in random I/Os. However, if we decide to read more blocks into each bucket, we will increase the total number of I/Os, which win result in the worst case with sequential I/Os in addition to random I/Os.

Let $\alpha$ be the number of blocks that we load into each bucket, where clearly, $1 \leq \alpha \leq (M/2B)^-$. Thus, in each call to one-pass sorting of bundle sorting we sort into $[M/(\alpha B)]$ distinct keys resulting in a total of $\log_M/(\alpha B)$ k passes over the sequence. However, we are now sure that at least $(\alpha-1)/\alpha$ of the I/Os are sequential. We differentiate between the I/Os required in the external count-sort in which we only perform sequential I/Os and the sorting pass in which we also have random I/Os. Using Theorem 4.2, the performance is now $$\frac{2N}{B}\left(\frac{1}{\alpha}(l + \alpha r)\log_{M/\alpha B}k + r\log_{M/B}\frac{k}{B}\right)$$

I/Os, and the optimal value of $\alpha$ can be determined via an option procedure. In Section 7 we show experimentally how the execution time vanes in this model as we change $\alpha$.

We conducted several experiments with various data sets and settings, while changing the size of the data sets N, the available memory M, the transfer block size B, and the number of distinct items k. The data sets were generated by the IBM test data generator (http://www.almaden.ibm.com/cs/quest). In all our experiments, the records consisted of 10-byte keys in 100-byte records- AU experiments were run on a Pentium2, 300 Mhz, 128 MB RAM machine.

Figure 2:
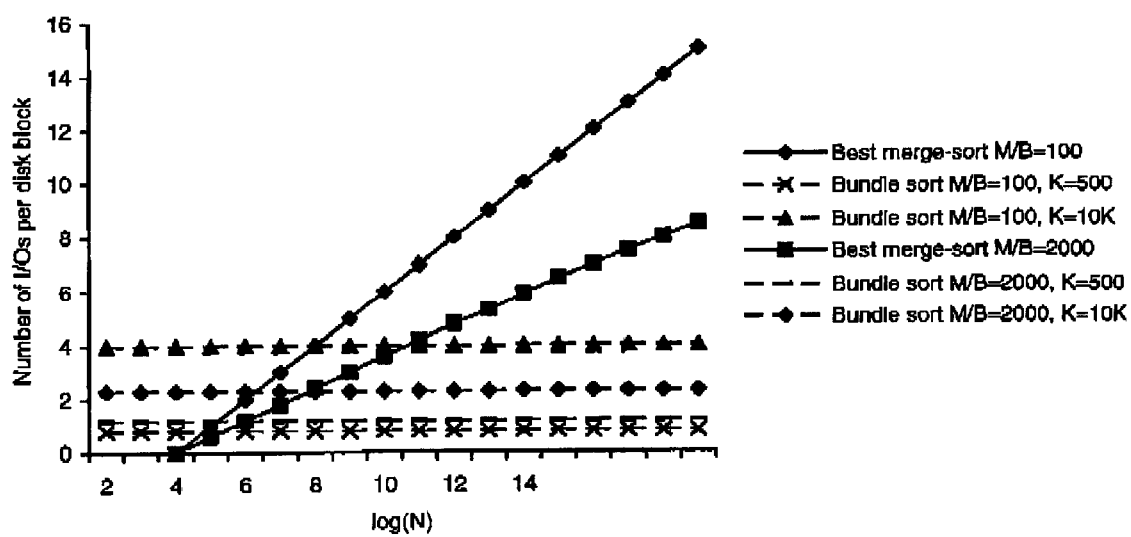
FIG. 2 illustrates Bundle sorting vs. regular sorting (best merge sort, for instance). The x-axis is the size of the data set drawn on a log-scale. The y-axis is the number of I/Os performed per block of input. As can be seen, in contrast to merge sort, the number of I/Os per block in bundle sorting remains the same for a constant k as N increases.

We first demonstrate an important feature of bundle sorting: As long as the number k of distinct keys remains constant, it performs the same number of I/O accesses per disk block with no dependence on the size of the data set. This is in contrast to general sort algorithms such as merge sort, which require more I/Os per disk block as the size of the data set increases. See FIG. 2: The parameter B was set to 10 KB and we tested for a memory of 1 MB and a memory of 20 MB. In both these cases merge sort, as expected, increases the number of I/Os per disk block as the size of the data set increased. In contrast, bundle sort performed a constant number of I/O accesses per disk block. As N increases, the improvement in performance becomes significant, demonstrating the advantages of bundle sorting. For instance, even when k=10000, and the available memory is 20 MB, the break-even point occurs at N=1 GB. As N increases, bundle sorting will perform better. If $k \leq 500$, then in the setting above, the break-even point occurs at N=10 MB, making bundle sorting most appealing.

Figure 3:
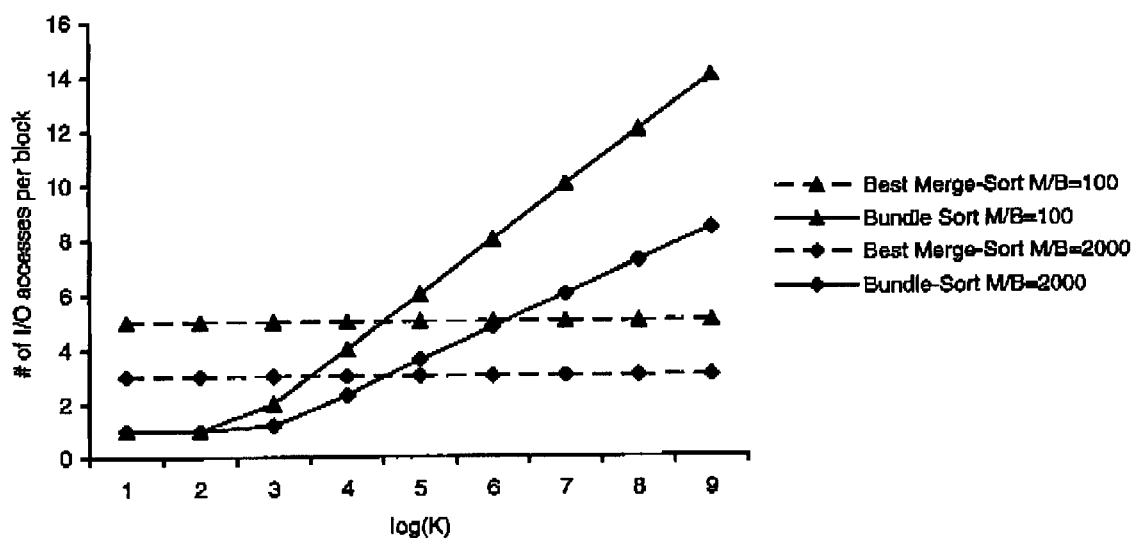
FIG. 3 illustrates Bundle sorting vs. regular sorting (best merge sort, for instance). The x-axis is the number of distinct keys (k) in the sequence drawn on a log-scale. The y-axis is the number of I/Os per disk block As can be seen, for k≦N/B, bundle sorting performs better than merge sort and the difference is large as k is smaller.

The next experiments demonstrate the performance of bundle sort as a function of k. See FIG. 3. We set N at a fixed size of 1 GB and B at 10 KB. We ran the tests with a memory of 1 MB and 20 MB and counted the number of I/Os. We let k vary over a wide range of values from 2 to $10^9$ ($k \leq N$ is always true). Since merge sort does not depend on the number of distinct keys, it performed the same number of I/O accesses per disk block in all these settings. In all these runs, as long as $k \leq N/B$, bundle sort performed better. When k is small the difference in performance is significant.

Figure 4:
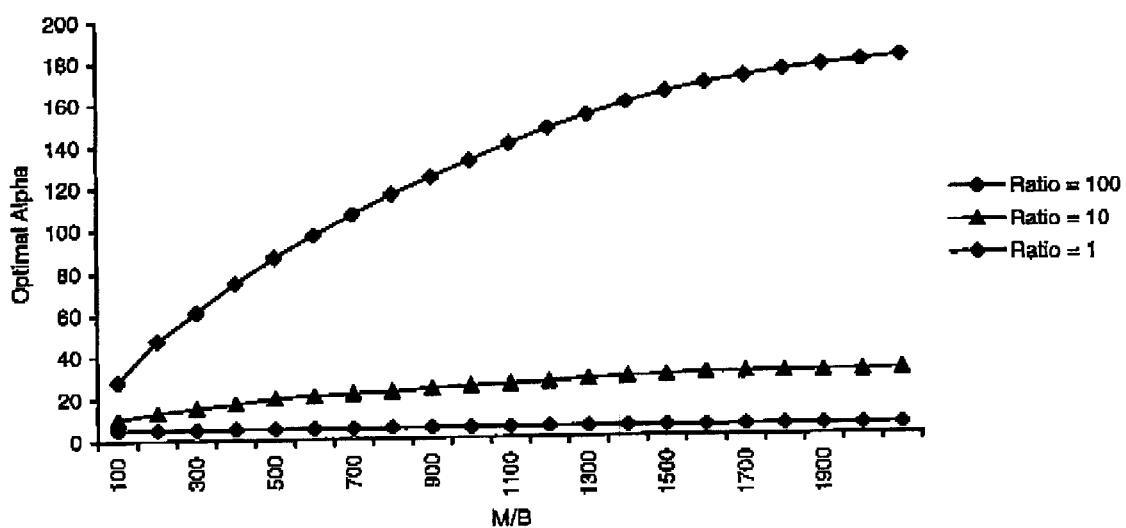
FIG. 4 illustrates Optimuilm bundle sorting in the disk latency model-resolving a as a function of r,l, and M/B.

As for the disk-latency model, we show the optimal $\alpha$ values for various settings. Recall that in this model we attribute different costs to sequential and random I/Os. See FIG. 4. We measured a for different ratios between l, the cost of moving the disk reader to a random location (the latency), and r, the cost of reading a transfer block of size B. Parameter a also depends on the relation between M and B, so we plot M/B on the x-axis of the graph. As can be seen, when the ratio is 1, the optimal algorithm is exactly our bundle sorting algorithm which only counts I/Os (hence it assumes that the cost of a random and a sequential I/O are equivalent). As this ratio increases, $\alpha$ increases, calling for a larger adaptation of our algorithm. Also affecting a, but in a more moderate way, is M/B. As this ratio increases, the optimum is achieved for a larger $\alpha$.

We considered the sorting problem for large data sets with moderate number of distinct keys, which we denote as bundle sorting, and identified it as a problem that is inherently easier than general sorting. We presented a simple, in-place sorting algorithm for external memory which may provide significant improvement over current sorting techniques. We also provided a matching lower bound, indicating that our solution is optimal.

Sorting is a fundamental problem and any improvement in its solution may have many applications. Por instance, consider the sort join algorithm that computes join queries by first sorting the two relations that are to be joined, after which the join can be done efficiently in only one pass on both relations. Clearly, if the relations are large and their keys are taken from a universe of moderate size, then bundle sorting could provide more efficient execution than general sort. It is interesting to note that the nature of the sorting algorithm is such that after the ith pass over the dataset, the sequence is fully sorted into $(([M/B])^i$ keys. In effect, the sequence is gradually sorted, where after each pass a further refinement is achieved until finally, the sequence is sorted. We can take advantage of this feature and use it in applications that benefit from quick, rough estimates which are gradually refined as we perform additional passes over the sequence. For instance, we could use it to produce intermediate join estimates, while refining the estimates by additional passes over the sequence. We can estimate the join after each iteration over the data set, improving the estimate after each such pass, and arrive at the final join after bundle sorting has completely finished.

Bundle sorting algorithm can be adapted efficiently and in a most straightforward way in the parallel disk model (PDM) described in (Vit99). We now assume, in the external memory model, that D>1, meaning that we can transfer D blocks into memory concurrently. This is like having D independent parallel disks. Assume that the data to be stored is initially located on one of the disks. In the first step we sort the data into exactly D buckets, writing each bucket into a distinct disk. Next, we sort, in parallel on each of the disks, the data set that was partitioned into each of the disks. Except for the initial partitioning step we make full utilization of the parallel disks, thus enhancing performance by a factor of nearly D over all the bounds given in this paper. Note that extending bundle sorting to fit the PDM model was straightforward because of its top-down nature. Bundle sorting can also be utilized to enhance the performance of general sorting when the available working space is substantially smaller than the input set.

Bundle sorting is a fully in-place algorithm which in effect causes the available memory to be doubled as compared to non-in-place algorithms. The performance gain from this feature can be significant. For instance, even if M/B=1000, the performance gain is 10% and can be much higher for a smaller ratio. In some cases, an in-place sorting algorithm can avoid the use of high cost memory such as virtual memory.

We considered the disk latency model, which is a more performance-sensitive model where we differentiate between two types of I/Os-sequential and random I/Os-with a redacted cost for sequential I/Os. This model can be more realistic for performance analysis, and we have shown the necessary adaptation in the bundle sorting algorithm to arrive at an optimal solution in this model.

We have shown experimentation with real and synthetic data sets, which demonstrates that the theoretical analysis gives an accurate prediction to the actual performance.

REFERENCES, INCORPORATED BY REFERENCE HEREIN

[ADADC+97] A. C. Arpaci-Dussaeu, R. H. Arpaci-Dussaeu, D. E. Culler, J. M. Hellerstein, and D. A. Patterson. High-performance sorting on networks of workstations. In *Proc. ACM SIGMOD International Conf. on Management of Data*, 1997.

[Aga96] R. C. Agarwal. A super scalar sort algorithm for rise processors. In *Proc. ACM SIGMOD International Conf. on Management of Data*, pages 240–246, June 1996.

[AV88] A. Aggarwal and J. S. Vitter. The input/output complexity of sorting and related problems. In *Communications of the ACM*, pages 31(9):1116–1127, 1988.

[BBW86] M. Beck, D. Bitton, and W. K., Wllinson. Sorting large files on a backend multiprocessor. Technical Report Technical report 86–741, Department of computer science, Cornell University, March 1986.

[BGK90] B. Baugsto, J. Greipsland, and J. Kamerbeek. Sorting large data files on porna. In *Proc. COMPAR90 VAPPIV*, pages 536–547, September 1990.

[FFM98] M. Faaach, P. Ferragina, and S. Muthukrishnan. Overcoming the memory bottlenect in suffix tree construction. In *Proc. of the 99th IEEE Annual Symp. on Foundation of Conputer Science*, pages 174–183, 1998.

[Gra93] Goetz Graefe. Query evaluation techniques for large databases. In ACM *Computing Surveys*, pages 25(2):73–170, June 1993.

[IBM95] IBM. Database 2, administration guide for common servers, version 2. June 1995.

[Knu73] D. E. Knuth. Sorting and Searching, volume 3 of *The Art of Computer Programming*. 1973.

[Vit99] J. S. Vitter. External memory algorithins and data structures. In J. Abello and J. S. Vitter, editors, *External Memory Algorithms and Visualization*. American Mathematical Society Press, Providence, RI, 1999. Updated version available via the author's web page http://wwv.cs.duke.edu/-jsv/.

[VVVI98] M. Wang, J. S. Vitter, and B. R. Iyer. Scalable mining for classification rules in relational databases. In *Proceedings of the International Database Engineering & Application Symposium*, pages 58–67, Cardiff, Wales, July 1998.

[ZL98] Weiye Zhang and Per-Ake Larson. Buffering and read-ahead strategies for external mergesort. In *Proc. of the Int'l Conf. on Very Large Data Bases (VLDB)*, pages 523–533, 1998.

What is claimed is:

1. A method of sorting data sets including a predetermined number of distinct keys, comprising the steps of:

bundling the data sets where substantially identical keys having substantially identical key values are bundled together; and ordering the bundles in a predeteined order with respect to the order defined by the substantially identical key values for each bundle, and wherein said method is performed using an external memory.

2. A method according to claim 1, wherein said method is performed without using additional working space in the external memory.

3. A method according to claim 1, wherein said bundling step further comprises bundling the data sets to a location within a specified range belonging to an associated bundle.

4. A system sorting data sets including a predetermined number of distinct keys, comprising the steps of:

bundling means for bundling the data sets where substantially identical keys having substantially identical key values are bundled together; and ordering means for ordering the bundles in a predetermined order with respect to the order defined by the substantially identical key values for each bundle, wherein said method is performed using an external memory.

5. A method for sorting large data sets that reside on external memory, given that the available memory is of size M and that the transfer block size is B, said method comprising the steps of:

defining a function that maps input keys into about M/B bundles (groups);

sorting the data set according to the bundles, resulting with about M/B sub-sequences, including the steps of:

counting the Dumber of input keys that belong to each bundle;

computing the range of disk blocks in which each bundle will reside upon termination of the sorting step;

loading the first block from each of the said ranges into main memory;

scanning the loaded blocks, while swapping keys so that each block is filled only with keys belonging to its bundle;

writing every block that is filled with the appropriate keys back to its location within its range on disk and loading the next block in its range; and re-iterating the above steps for each sub-sequence, until each bundle consists of one key only.

6. A method for sorting large data sets that reside on external memory, given that the available memory is of size M, that the transfer block size is B, and that the number of distinct keys is at most about M/B, said method comprising the steps of:

counting the number of input keys that belong to each bundle;

computing the range of disk blocks in which each bundle will reside upon termination of the sorting step;

loading the first block from each of the said ranges into main memory; scanning the loaded blocks, while swapping keys so that each block is filled only with keys belonging to its bundle;

writing every block that is filled with the appropriate keys back to its location within its range on disk and loading the next block in its range.

7. A method for sorting large data sets that reside on external memory, given that the available memory is of size M and that the transfer block size is B, said method comprising the steps of:

defining a function that maps input keys into about M/B bundles (groups);

sorting the data set according to the bundles, resulting with about M/B sub-sequences, including the steps of;

estimating the number of input keys that belong to each bundle;

computing the range of disk blocks in which each bundle will reside upon termination of the sorting step;

loading the first block from each of the said ranges into main memory;

scanning the loaded blocks, while swapping keys so that each block is filled only with keys belonging to its bundle;

writing every block that is filled with the appropriate keys back to its location within its range on disk and loading the next block in its range, and re-iterating the above steps for each sub-sequence, until each bundle consists of one key only.

8. A method for sorting large data sets that reside on external memory, given that the available memory is of size M, that the transfer block size is B, and that the number of distinct keys is at most about M/B, said method comprising the steps of:

estimating the number of input keys that belong to each bundle;

computing the range of disk blocks in which each bundle will reside upon termination of the sorting step;

loading the first block from each of the said ranges into main memory;

scanning the loaded blocks, while swapping keys so that each block is filled only with keys belonging to its bundle;

writing every block that is filled with the appropriate keys back to its location within its range on disk and loading the next block in its range.

\* \* \* \* \*